United States Patent
Guo (10) Patent No.: US 9,781,605 B2
(45) Date of Patent: Oct. 3, 2017

(54) CELL ACTIVATION METHOD AND APPARATUS

(71) Applicant: Huawei Technologies Co., Ltd., Shenzhen (CN)

(72) Inventor: Yuanyuan Guo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/198,198

(22) Filed: Jun. 30, 2016

(65) Prior Publication Data

US 2016/0309333 A1  Oct. 20, 2016

Related U.S. Application Data

(63) Continuation of application No. PCT/CN2014/095504, filed on Dec. 30, 2014.

(30) Foreign Application Priority Data

Dec. 30, 2013 (CN) .......................... 2013 1 0747063

(51) Int. Cl.
*H04W 16/06* (2009.01)
*H04W 24/02* (2009.01)
*H04W 72/10* (2009.01)

(52) U.S. Cl.
CPC ........... *H04W 16/06* (2013.01); *H04W 24/02* (2013.01); *H04W 72/10* (2013.01)

(58) Field of Classification Search
CPC ..... H04W 16/06; H04W 72/10; H04W 24/02; H04W 36/0061; H04W 36/04; H04W 36/0083; H04W 84/20; H04W 84/18; H04W 84/10; H04W 36/38; H04W 8/26; H04W 8/265; H04W 16/00; H04W 16/02;
(Continued)

(56) References Cited

U.S. PATENT DOCUMENTS 5,210,753 A * 5/1993 Natarajan ......... H04W 72/1231
370/338
5,907,544 A * 5/1999 Rypinski ................ H04H 20/67
370/337

(Continued)

FOREIGN PATENT DOCUMENTS

CN     101808365 A     8/2010
CN     102378172 A     3/2012
(Continued)

OTHER PUBLICATIONS

Partial English Translation and Abstract of Chinese Patent Application No. CN101808365, Jul. 7, 2016, 19 pages.
(Continued)

*Primary Examiner* — Meless Zewdu
(74) *Attorney, Agent, or Firm* — Conley Rose, P.C.

(57) ABSTRACT

A cell activation method and apparatus. After multiple cells to be activated are determined, the multiple cells are activated in sequence according to a priority sequence of the multiple cells, so that in a case in which base station resources are insufficient, an important cell ranking higher in the priority sequence is preferentially activated to preferentially occupy the base station resource and provide a service to the outside, and further, stability of a wireless communications system is improved.

11 Claims, 5 Drawing Sheets

(58) Field of Classification Search
CPC ..... H04W 16/08; H04W 16/10; H04W 16/24; H04W 76/025; H04W 76/027; H04W 16/12; H04W 52/244; H04W 72/1242; H04W 72/1247
See application file for complete search history.

(56) References Cited

U.S. PATENT DOCUMENTS

| | | | | |
|---|---|---|---|---|
| 8,515,410 | B1* | 8/2013 | Bach | H04W 52/0206 455/418 |
| 8,929,296 | B2* | 1/2015 | De Domenico | H04W 52/0206 370/328 |
| 9,107,056 | B2* | 8/2015 | Damnjanovic | H04W 8/22 |
| 2008/0096546 | A1* | 4/2008 | Guo | H04W 16/28 455/424 |
| 2011/0300887 | A1* | 12/2011 | Osterling | H04W 52/0206 455/507 |
| 2012/0044824 | A1* | 2/2012 | Osterling | H04W 52/0225 370/252 |
| 2013/0053091 | A1* | 2/2013 | Jorguseski | H04W 24/02 455/524 |
| 2013/0083714 | A1* | 4/2013 | Joko | H04W 52/0206 370/311 |
| 2013/0281076 | A1* | 10/2013 | Damnjanovic | H04W 8/22 455/418 |
| 2013/0286851 | A1* | 10/2013 | Moser | H04W 88/10 370/241.1 |
| 2014/0134993 | A1* | 5/2014 | Kwak | H04W 52/0206 455/418 |
| 2014/0146680 | A1* | 5/2014 | Wang | H04W 52/0206 370/236 |
| 2014/0177557 | A1* | 6/2014 | Charbit | H04W 24/10 370/329 |
| 2016/0044735 | A1* | 2/2016 | Ohta | H04W 76/025 455/422.1 |

FOREIGN PATENT DOCUMENTS

| | | |
|---|---|---|
| CN | 102378238 A | 3/2012 |
| CN | 102405672 A | 4/2012 |
| CN | 103747529 A | 4/2014 |
| WO | 2009140988 A1 | 11/2009 |

OTHER PUBLICATIONS

Partial English Translation and Abstract of Chinese Patent Application No. CN103747529, Jul. 7, 2016, 3 pages.
Partial English Translation and Abstract of Chinese Patent Application No. CN102378172, Part 1, Jul. 7, 2016, 6 pages.
Partial English Translation and Abstract of Chinese Patent Application No. CN102378172, Part 2, Jul. 26, 2016, 3 pages.
Audsley, N., et al., "Fixed Priority Pre-emptive Scheduling: An Historical Perspective," Department of Computer Science, vol. 8, No. 2/03, Mar. 1995, pp. 173-198.
Foreign Communication From A Counterpart Application, Chinese Application No. 201310747063.9, Chinese Office Action dated May 31, 2016, 6 pages.
Foreign Communication From A Counterpart Application, European Application No. 14875950.9, Extended European Search Report dated Oct. 24, 2016, 12 pages.
Foreign Communication From A Counterpart Application, PCT Application No. PCT/CN2014/095504, English Translation of International Search Report dated Apr. 3, 2015, 2 pages.
Foreign Communication From A Counterpart Application, PCT Application No. PCT/CN2014/095504, English Translation of Written Opinion dated Apr. 3, 2015, 10 pages.

* cited by examiner

CELL ACTIVATION METHOD AND APPARATUS

CROSS-REFERENCE TO RELATED APPLICATIONS

This application is a continuation of international patent application number PCT/CN2014/095504 filed on Dec. 30, 2014 and titled "Cell Activation Method and Device," which claims priority to Chinese patent application number 201310747063.9 filed on Dec. 30, 2013 and titled "Cell Activation Method and Cell Activation Device," both of which are incorporated by reference.

TECHNICAL FIELD

This application relates the field of communications technologies, and in particular, to a cell activation method and apparatus.

BACKGROUND

In a Long-Term Evolution (LTE) wireless communications system, a base station can control multiple cells, and can allocate resources to the cells by activating the cells, so that the cells can provide services to the outside.

However, the resources that can be allocated to the cells are limited. If a quantity of cells that need to be activated is relatively large, and the resources of the base station are insufficient or some resources of the base station are faulty, some cells probably cannot acquire the base station resources, and cannot provide services to the outside. When some important cells cannot provide services to the outside, some important services cannot be executed, and further, stability of the wireless communications system may be affected.

SUMMARY

This application provides a cell activation method and apparatus, so as to improve stability of a wireless communications system.

To achieve the foregoing objective, a first aspect of this application provides a cell activation method, including determining multiple target cells that are currently to be activated; determining a priority sequence of the multiple target cells; and activating the multiple target cells in sequence according to the determined priority sequence.

With reference to the first aspect, in a first possible implementation manner, the determining a priority sequence of the multiple target cells includes determining the priority sequence of the multiple target cells according to preset priorities of the multiple target cells.

With reference to the first aspect, in a second possible implementation manner, the determining multiple target cells that are currently to be activated includes determining multiple base stations that are interconnected by using a universal switching unit; and acquiring, as the multiple target cells, cells that are currently to be activated in the multiple base stations.

With reference to the second possible implementation manner of the first aspect, in a third possible implementation manner, the determining a priority sequence of the multiple target cells includes acquiring priorities of the base stations to which the multiple target cells belong and sorting the multiple target cells according to the priorities of the base stations to which the multiple target cells belong.

With reference to the third possible implementation manner of the first aspect, in a fourth possible implementation manner, in a process of sorting the multiple target cells according to the priorities of the base stations to which the multiple target cells belong, when a first target cell and a second target cell in the multiple target cells are located in a same base station or are located in base stations with a same priority, ranking the first target cell above the second target cell, or ranking the second target cell above the first target cell.

With reference to the third possible implementation manner of the first aspect, in a fifth possible implementation manner, in a process of sorting the multiple target cells according to the priorities of the base stations to which the multiple target cells belong, when a first target cell and a second target cell in the multiple target cells are located in a same base station or are located in base stations with a same priority, sorting the first target cell and the second target cell according to initial priorities of the first target cell and the second target cell in the base stations to which the first target cell and the second target cell belong.

With reference to the first aspect and any one of the foregoing possible implementation manners of the first aspect, in a sixth possible implementation manner, before the determining multiple target cells that are currently to be activated, the method further includes determining an active cell that is currently in an active state; and after the activating the multiple target cells in sequence according to the determined priority sequence, the method further includes, when it is detected that an abnormal target cell that is not activated exists in the multiple target cells, and a priority of the abnormal target cell is higher than a priority of the active cell, deactivating the active cell, and activating the abnormal target cell.

A second aspect of this application provides a cell activation apparatus, including a first determining unit configured to determine multiple target cells that are currently to be activated, a second determining unit configured to determine a priority sequence of the multiple target cells, and an activation unit configured to activate the multiple target cells in sequence according to the priority sequence that is determined by the second determining unit.

With reference to the second aspect, in a first possible implementation manner, the second determining unit is specifically configured to determine the priority sequence of the multiple target cells according preset priorities of the multiple target cells.

With reference to the second aspect, in a second possible implementation manner, the first determining unit is specifically configured to: determine multiple base stations that are interconnected by using a universal switching unit; and acquire, as the multiple target cells, cells that are currently to be activated in the multiple base stations.

According to the second possible implementation manner of the second aspect, in a third possible implementation manner, the apparatus further includes an acquiring unit configured to acquire priorities of the base stations to which the multiple target cells belong, where the second determining unit is specifically configured to: sort the multiple target cells according to the priorities, acquired by the acquiring unit, of the base stations to which the multiple target cells belong.

With reference to the third possible implementation manner of the second aspect, in a fourth possible implementation manner, the second determining unit is specifically configured to: sort the multiple target cells according to the priorities, acquired by the acquiring unit, of the base stations to which the multiple target cells belong, and when a first target cell and a second target cell in the multiple target cells are located in a same base station or are located in base stations with a same priority, rank the first target cell above the second target cell, or rank the second target cell above the first target cell.

With reference to the third possible implementation manner of the second aspect, in a fifth possible implementation manner, the second determining unit is specifically configured to sort the multiple target cells according to the priorities, acquired by the acquiring unit, of the base stations to which the multiple target cells belong, and when a first target cell and a second target cell in the multiple target cells are located in a same base station or are located in base stations with a same priority, sort the first target cell and the second target cell according to initial priorities of the first target cell and the second target cell in the base stations to which the first target cell and the second target cell belong.

With reference to the second aspect and any one of the foregoing implementation manners of the second aspect, in a sixth possible implementation manner, where before determining the multiple target cells that are currently to be activated, the first determining unit is further configured to determine an active cell that is currently in an active state; and the apparatus further includes a detection unit configured to detect whether an abnormal target cell that is not activated exists in the multiple target cells; and a deactivation unit configured to, when the detection unit finds through detection the abnormal target cell, and that a priority of the abnormal target cell is higher than a priority of the active cell, deactivate the active cell, where the activation unit is further configured to activate the abnormal target cell.

As can be known from the above, in this application, multiple target cells are activated in sequence according to a priority sequence of the multiple target cells that are currently to be activated, so that an important cell ranking higher in the priority sequence is preferentially allocated a resource. In a case in which base station resources are insufficient, cases that the important cell cannot provide a service to the outside because the important cell cannot be allocated the base station resource are effectively reduced, and further, stability of a wireless communications system is improved.

BRIEF DESCRIPTION OF DRAWINGS

To describe the technical solutions in the embodiments of the present application more clearly, the following briefly introduces the accompanying drawings required for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

This application provides a cell activation method and apparatus, so as to ensure that system stability of a wireless communications system is improved.

The following clearly describes the technical solutions in the embodiments of the present application with reference to the accompanying drawings in the embodiments of the present application. The described embodiments are merely some but not all of the embodiments of the present application. All other embodiments obtained by a person of ordinary skill in the art based on the embodiments of the present application without creative efforts shall fall within the protection scope of the present application.

Figure 1:
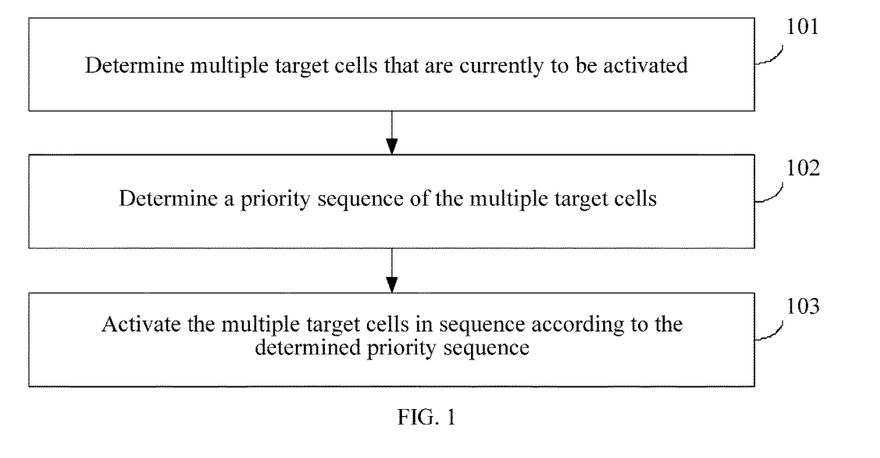
FIG. 1 is a schematic flowchart of an embodiment of a cell activation method according to this application.

Refer to FIG. 1, which is a schematic flowchart of an embodiment of a cell activation method according to this application. The method of this embodiment may include the following steps:

101: Determine multiple target cells that are currently to be activated.

Information about cells that need to be activated can be configured in a base station. The target cells that need to be activated can be determined according to the configuration information of the cells in the base station.

102: Determine a priority sequence of the multiple target cells.

The priority sequence of the multiple target cells can reflect a sequence of importance of the multiple target cells. For example, greater importance of a service that is provided by a target cell in the wireless communications system indicates a higher rank of the target cell in the priority sequence of the multiple target cells.

103: Activate the multiple target cells in sequence according to the determined priority sequence.

Unlike an existing cell activation manner, in this embodiment of this application, the target cells are activated in sequence according to the priority sequence of the multiple target cells, to implement preferential activation of a cell ranking higher in the priority sequence, so that the important cell ranking higher can be preferentially allocated a base station resource.

In this embodiment, after the multiple target cells that are to be activated are determined, the target cells are activated in sequence according to the priority sequence of the target cells, so that a target cell ranking higher is preferentially allocated a resource. In this way, when the target cell is the important cell ranking higher in the priority sequence, the important cell can be preferentially activated and be preferentially allocated the base station resource. Therefore, in a case in which base station resources are insufficient, a problem that the important cell cannot provide a service to the outside because the important cell cannot be allocated the base station resource is effectively reduced, and further, stability of a wireless communications system is improved.

In any one of embodiments of this application, a process of activating each target cell is the same as an existing cell activation process. For example, when a target cell is activated, the target cell may fail to be activated because of the insufficient base station resources. Different target cells need different base station resources. Therefore, when the base station resource cannot meet a resource requirement of a target cell, the base station resource can meet a resource requirement of another target cell.

Therefore, in this embodiment of this application, when the target cells are activated in sequence, actually, a target cell ranking higher in the priority sequence is preferentially activated. If the target cell is activated successfully, a next target cell is sequentially activated; if the target cell cannot be activated because the base station resource cannot meet the resource requirement of the target cell, a next target cell is activated according to the priority sequence, and by analogy, until an activation operation is performed on all target cells. That is, after an activation is performed on a target cell, no matter whether the target cell is activated successfully or not, an activation is performed on the next target cell.

In the wireless communications system, the method may be applied to at least the following two scenarios.

One is that a base station independently manages resources in the base station, and is responsible for activating cells that are under control of the base station.

The other is that in a scenario of baseband (BB) cloud, multiple base stations may be interconnected in the scenario by using a universal switching unit (USU). In the multiple base stations, one base station is responsible for managing the base station resources in the multiple base stations, and is responsible for controlling activation of the cells.

The two cases are described as follows respectively.

Figure 2:
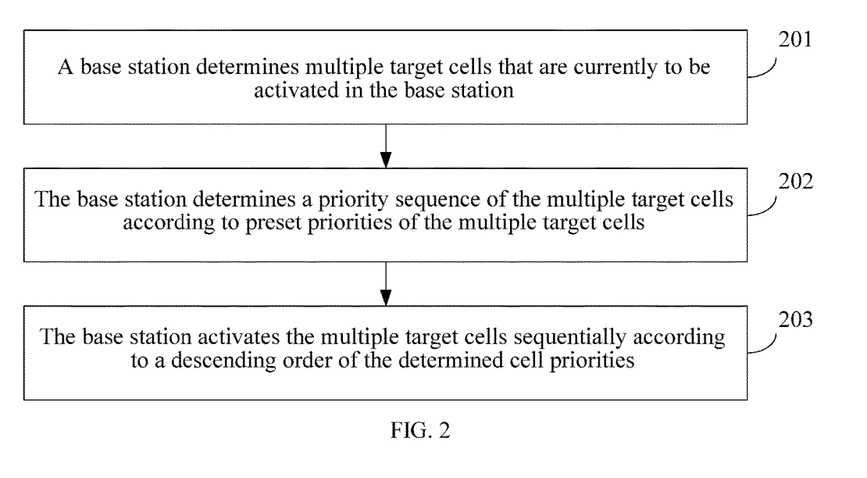
FIG. 2 is a schematic flowchart of another embodiment of a cell activation method according to this application.

For the case that a single base station independently activates a cell, refer to FIG. 2, which is a schematic flowchart of another embodiment of a cell activation method according to this application. The method of this embodiment may include the following steps.

201: A base station determines multiple target cells that are currently to be activated in the base station.

202: The base station determines a priority sequence of the multiple target cells according to preset priorities of the multiple target cells.

In this embodiment, not only target cells that need to be activated are configured in advance for the base station, but also priorities of the multiple target cells need to be configured in the base station. The base station can directly determine the priority sequence of the multiple target cells according to preset priority sequence information.

203: The base station activates the multiple target cells in sequence according to the determined priority sequence.

Figure 3:
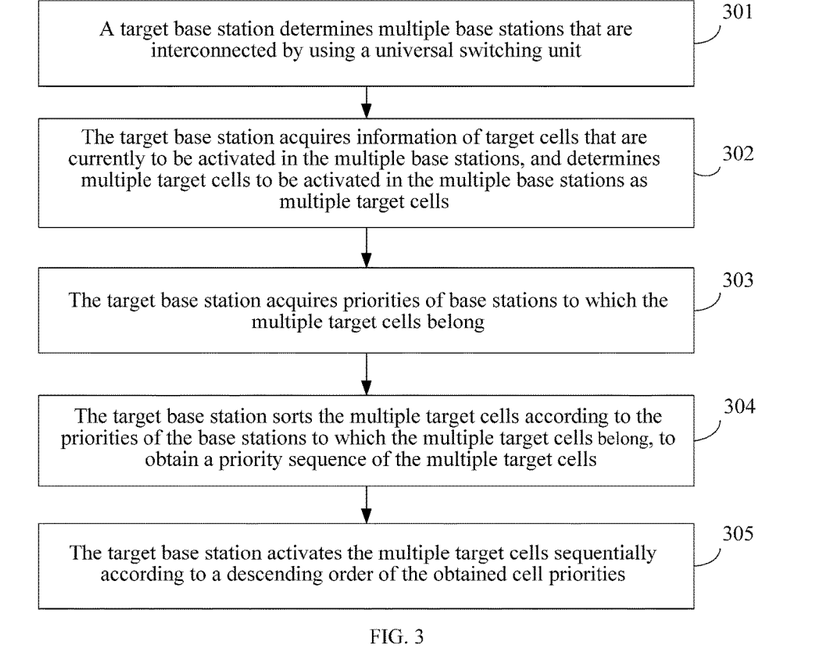
FIG. 3 is a schematic flowchart of another embodiment of a cell activation method according to this application.

For the case of the baseband cloud, refer to FIG. 3, which is a schematic flowchart of another embodiment of a cell activation method according to this application. The method of this embodiment may include the following steps.

301: A target base station determines multiple base stations that are interconnected by using a universal switching unit.

Figure 4:
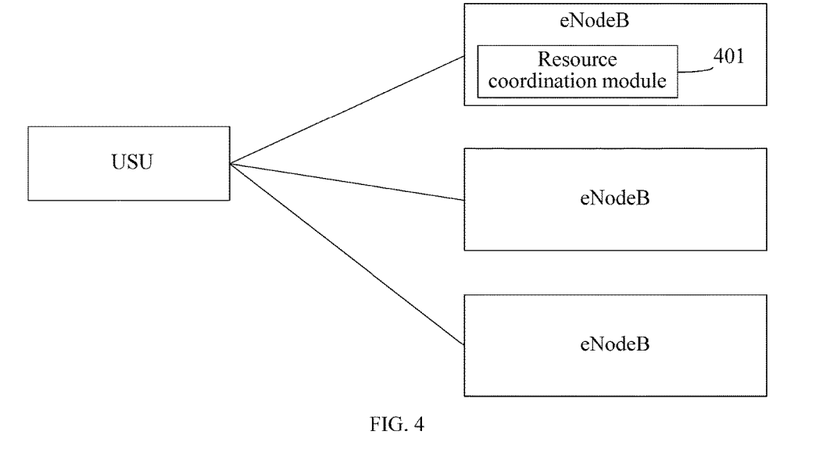
FIG. 4 is a schematic diagram of a system architecture of an application scenario of a cell activation method according to this application.

In this embodiment, the multiple base stations are interconnected by using the universal switching unit, as shown in FIG. 4. The multiple interconnected base stations may be viewed as a base station group. In the base station group, some resources may be shared in the base stations. For example, a baseband resource of the multiple base stations may be shared in the multiple base stations.

A resource coordination module 401 is disposed on one base station, an evolved node B (eNodeB), in the multiple interconnected base stations, eNodeBs. The base station provided with the resource coordination module can manage resources in the base station and in other base stations, and is responsible for controlling activation of cells in each base station.

For the convenience of differentiation, a base station that controls resource management in the multiple interconnected base stations and that controls activation of cells is referred to as a target base station. The target base station is also interconnected to another base station by using the universal switching unit. Therefore, the determined interconnected multiple target base stations include the target base station.

302: The target base station acquires, as the multiple target cells, cells that are currently to be activated in the multiple base stations.

At least one target cell to be activated may be configured for each interconnected base station. Alternatively, a target cell to be activated may be configured for some base stations in the interconnected multiple base stations, while information about a cell to be activated is not configured in the other base stations.

The target base station can acquire information about the target cells to be activated in the target base station and in other base stations interconnected to the target base station, so as to determine multiple target cells that are currently to be activated.

A manner in which the target base station acquires the cells that are currently to be activated from other base stations is similar to an existing manner. For example, the manner may be that each base station that is interconnected to the target base station in the multiple base stations determines a cell that is currently to be activated and sends information about the cell that is currently to be activated to the target base station. Certainly, in an actual application, there may be another manner to determine the cells that are currently to be activated in the multiple base stations, which are not limited herein.

303: The target base station acquires priorities of base stations to which the multiple target cells belong.

Multiple manners may be used to acquire a base station priority of each base station. For example, information about base station priorities of all interconnected base stations is preset in the target base station, so that the target base station can directly inquire the preset information and determines base station priorities of the multiple base stations. For another example, a base station priority of each base station is only configured in the base station itself in the interconnected multiple base stations. In this way, the target base station can separately acquire the base station priority of each base station from the interconnected multiple base stations.

304: The target base station sorts the multiple target cells according to the priorities of the base stations to which the multiple target cells belong, to obtain a priority sequence of the multiple target cells.

The priority sequence of the base stations to which the multiple target cells belong determines the priority sequence of the multiple target cells. For example, the target cells are sorted in descending order according to the priorities of the base stations to which the target cells belong. A higher priority of the base station to which the target cell belongs indicates a higher rank of the target cell in the priority sequence.

Optionally, in a process of sorting the multiple target cells, when a first target cell and a second target cell in the multiple target cells are located in a same base station or are located in base stations with a same priority, the first target cell is ranked above the second target cell, or the second target cell is ranked above the first target cell.

Optionally, in a process of sorting the multiple target cells, when a first target cell and a second target cell in the multiple target cells are located in a same base station or are located in base stations with a same priority, the first target cell and the second target cell are sorted according to initial priorities of the first target cell and the second target cell in the base stations to which the first target cell and the second target cell belong.

For example, using sorting in descending order according to the priorities as an example, a target cell 1 and a target cell 2 both belong to a base station A. Assuming that an initial priority of the target cell 1 in the base station A is higher than an initial priority of the target cell 2 in the base station, it is determined that the priority of the target cell 1 is ranked above the target cell 2.

The initial priority of the base station to which the target cell belongs refers to, in the base station to which the target cell belongs, a priority of the target cell with respect to another target cell in the base station.

305: The target base station activates the multiple target cells in sequence according to the obtained priority sequence.

A process in which the target base station activates each target cell is similar to an existing process in which a target base station in the baseband cloud activates a cell. For example, the target base station may send instruction information to the base station to which the target cell belongs, to instruct the base station to which the target cell belongs to activate the target cell.

Optionally, in any one of the foregoing embodiments, before the multiple target cells that are currently to be activated are determined, an active cell that is currently in an active state may further be determined. After the multiple target cells are activated in sequence according to the determined priority sequence, if it is detected that an abnormal target cell that is not activated exists in the multiple target cells, a priority of the abnormal target cell may be compared with a priority of the active cell. When the priority of the abnormal target cell is higher than the priority of the active cell, the active cell is deactivated, and the abnormal target cell is activated.

In this embodiment of this application, for the convenience of differentiation, a cell that is in an active state before the target cell is determined is referred to as an active cell.

Before the target cell is determined, if an active cell that is in the active state already exists, and a cell priority of the active cell is lower than a cell priority of a target cell that is not currently activated, the active cell may be released, and the target cell that is not currently activated is activated, so that a resource occupied by the active cell is allocated to the target cell, and the target cell with a higher priority can be allocated the resource. Further, stability of the wireless communications system is further improved.

Optionally, after it is determined that the priority of the abnormal cell is higher than the priority of the active cell, when it is determined that service traffic of the active cell is lower than a preset threshold, the active cell may be deactivated, and the abnormal target cell is activated.

Figure 5:
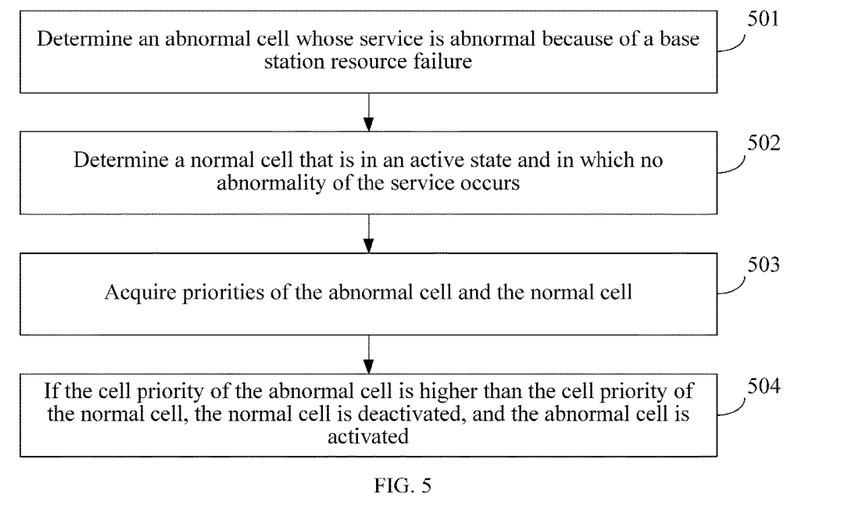
FIG. 5 is a schematic flowchart of an embodiment of another cell activation method according to this application.

In another aspect, this application further provides another cell activation method. Refer to FIG. 5, which is a schematic flowchart of an embodiment of another cell activation method according to this application. The method of this embodiment may include the following steps:

501: Determine an abnormal cell whose service is abnormal because of a base station resource failure.

After the base station successfully activates the cell, if some resources in the base station fail, cells that occupy the resources cannot provide a service to the outside. The service is therefore abnormal. In this embodiment of this application, the cell whose service is abnormal because of the base station resource failure is referred to as an abnormal cell.

The base station resource refers to a resource that may be allocated to a cell in the base station, such as a radio frequency resource, a baseband board resource, or a license resource. Failures of the radio frequency resource and the baseband board resource in the base station, invalidity of a license in the base station, or the like may all be deemed as the resource failure.

502: Determine a normal cell that is in an active state and in which no abnormality of the service occurs.

503: Acquire priorities of the abnormal cell and the normal cell.

504: If the cell priority of the abnormal cell is higher than the cell priority of the normal cell, the normal cell is deactivated, and the abnormal cell is activated.

The normal cell whose cell priority is lower than the cell priority of the abnormal cell is determined by comparing the priorities of the normal cell and the abnormal cell.

If the cell priority of the abnormal cell is higher than the cell priority of the normal cell, it indicates that the abnormal cell is a cell more important than the normal cell. To ensure that the abnormal cell can normally provide a service to the outside, the normal cell with the lower cell priority is deactivated, and the abnormal cell with the higher cell priority is activated, so that the abnormal cell can occupy a base station resource of the normal cell with the lower priority, and further it is possible for the abnormal cell to provide the service to the outside.

In this embodiment, after a base station successfully activates a cell, and after an abnormal cell whose service is abnormal because of a base station resource failure is determined, if a cell priority of the abnormal cell is higher than a cell priority of a normal cell, the normal cell is deactivated, and the abnormal cell is activated, so that the abnormal cell with a higher priority is preferentially in an active state and provides a service to the outside, so as to reduce cases that an important cell with a higher priority cannot provide the service to the outside because of the insufficient base station resources, and further to improve stability of a wireless communications system.

Optionally, in any one of embodiments of this application, if the cell priority of the abnormal cell is higher than the cell priority of the normal cell, when service traffic of the normal cell is less than a preset threshold, the normal cell may be deactivated, and the abnormal cell may be activated.

When the service traffic of the normal cell is less than the preset threshold, deactivating the normal cell can reduce a quantity of user equipments that are affected by deactivation of the cell.

In the cell activation method in the embodiment shown in FIG. 5, two application scenarios described above also exist.

When a single base station independently performs cell activation control, the base station can determine a cell whose service is abnormal because of a resource failure in the base station, and determines the normal cell in the active state in the base station. In addition, the cell priorities of the abnormal cell and the normal cell can be determined by inquiring preset cell priority information in the base station. If the base station determines that the cell priority of the abnormal cell is higher than the cell priority of the normal cell, the base station deactivates the normal cell, and activates the abnormal cell.

Figure 6:
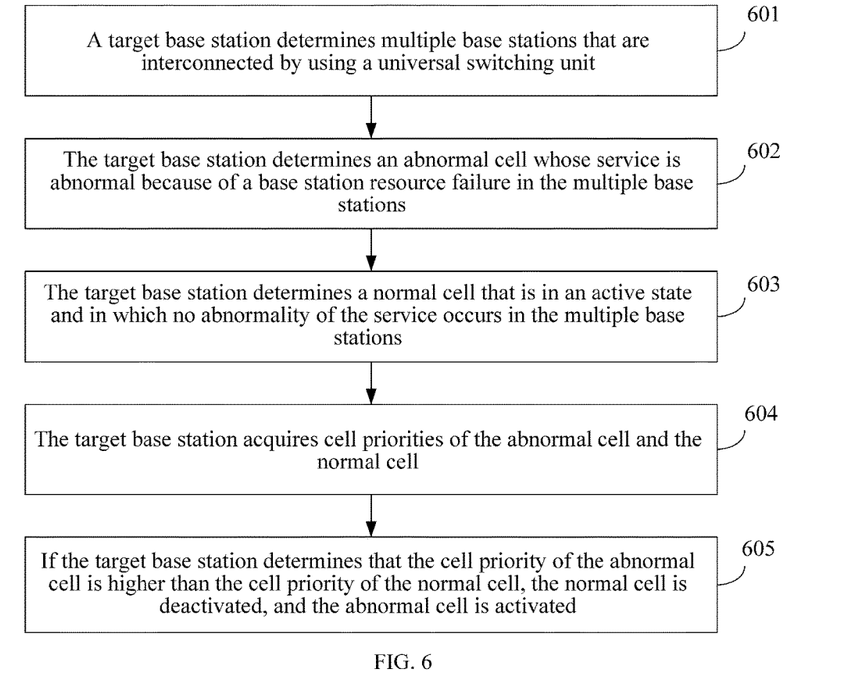
FIG. 6 is a schematic flowchart of another embodiment of another cell activation method according to this application.

For the baseband cloud scenario, refer to FIG. 6, which is a schematic flowchart of another embodiment of another cell activation method according to this application. The method of this embodiment may include the following steps:

601: A target base station determines multiple base stations that are interconnected by using a universal switching unit.

The target base station is also included in the multiple base stations. For a specific process of the step, reference may be made to step 301 of the embodiment of FIG. 3. Details are not described herein again.

602: The target base station determines an abnormal cell whose service is abnormal because of a base station resource failure in the multiple base stations.

603: The target base station determines a normal cell that is in an active state and in which no abnormality of service occurs in the multiple base stations.

The target base station can separately acquire information about the abnormal cell and the normal cell in any one of the base stations in interconnected multiple base stations, and determine all abnormal cells and normal cells existing in the multiple base stations.

604: The target base station acquires cell priorities of the abnormal cell and the normal cell.

In this embodiment, before step 601, when the target base station activates the abnormal cell and the normal cell, if the cell priorities of the abnormal cell and the normal cell have already been acquired by using the manner in the embodiment of FIG. 4, the priorities of the abnormal cell and the normal cell can be directly determined.

If the cell priorities of the abnormal cell and the normal cell are not stored in the target base station, the target base station can acquire a base station priority of a base station, an initial priority of the abnormal cell in a base station to which the abnormal cell belongs, and an initial priority of the normal cell in a base station to which the normal cell belongs. Then, the cell priority of the abnormal cell and the cell priority of the normal cell are determined according to the base station priority, the initial priority of the abnormal cell, and the initial priority of the normal cell.

For either of the normal cell and the abnormal cell, a higher cell priority of the cell indicates a higher base station priority of the base station to which the cell belongs, and indicates a higher initial priority of the cell in the base station to which the cell belongs.

605: If the target base station determines that the cell priority of the abnormal cell is higher than the cell priority of the normal cell, the normal cell is deactivated, and the abnormal cell is activated.

It may be understood that in any one of the foregoing embodiments, multiple abnormal cells may be determined. In this case, the abnormal cells may be processed in sequence according to a priority sequence of the abnormal cells. For example, the abnormal cells may be determined as abnormal target cells sequentially in descending order of cell priorities of the abnormal cells. When the cell priority of the abnormal target cell that is currently determined is higher than the cell priority of the normal cell, the normal cell is deactivated, and the abnormal target cell is activated, until all abnormal cells are used as abnormal target cells.

Certainly, in any one of the foregoing embodiments, for any one of abnormal cells, there may be multiple normal cells whose cell priorities are lower than the cell priority of the abnormal target cell. In this case, the multiple normal cells may be used, sequentially according to the priorities of the normal cells in ascending order, as normal target cells to be deactivated, and the current normal target cell is deactivated.

After the normal target cell is deactivated, if a resource occupied by the normal target cell can meet a resource requirement of the abnormal target cell, a next abnormal target cell may be determined according to a descending order of the priorities of the abnormal cells. After the normal target cell is deactivated, if the resource occupied by the normal target cell cannot meet the resource requirement of the abnormal target cell, a next abnormal target cell may be determined accordingly, until all normal cells are used as the normal target cells.

In any one of the foregoing embodiments, after the normal cell is deactivated, if it is detected that the resource occupied by the normal cell cannot meet the resource requirement of the abnormal cell, that is, the resource needed by the abnormal cell is greater than the resource occupied by the normal cell, the abnormal cell cannot be activated. In this case, the normal cell may be reactivated, so that the normal cell can still provide a service to the outside, and further a quantity of cells that cannot provide the service to the outside is reduced.

For brief description, the foregoing method embodiments are represented as a series of actions. However, a person skilled in the art should appreciate that the present application is not limited to the described order of the actions, because according to the present application, some steps may be performed in other orders or simultaneously. It should be further appreciated by a person skilled in the art that the embodiments described in this specification all belong to exemplary embodiments, and the involved actions and modules are not necessarily required by the present application.

Figure 7:
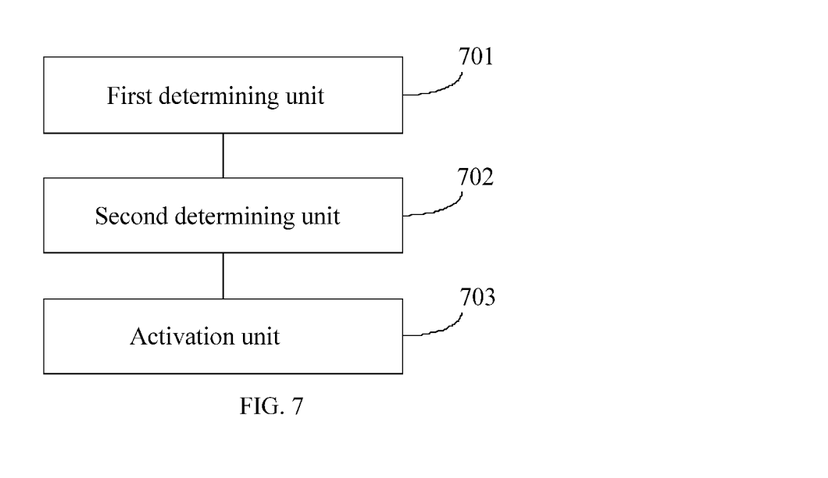
FIG. 7 is a schematic structural diagram of an embodiment of a cell activation apparatus according to this application.

Corresponding to a cell activation method of this application, this application further provides a cell activation apparatus. Refer to FIG. 7, which is a schematic structural diagram of an embodiment of the cell activation apparatus according to this application. The apparatus of this embodiment may include a first determining unit 701 configured to determine multiple target cells that are currently to be activated, a second determining unit 702 configured to determine a priority sequence of the multiple target cells, and an activation unit 703 configured to activate the multiple target cells in sequence according to the priority sequence that is determined by the second determining unit.

In this embodiment, the activation unit activates the multiple target cells in sequence according to the priority sequence, determined by the second determining unit, of the target cells that are to be activated, so that an important cell ranking higher in the priority sequence is preferentially activated. Therefore, cases that the important cell cannot be activated because of the insufficient base station resources are effectively reduced, which is beneficial to execution of important services, and further, stability of a wireless communications system is improved.

Optionally, in a case in which a single base station independently controls cell activation, the second determining unit 702 is specifically configured to determine the priority sequence of the multiple target cells according to preset priorities of the multiple target cells.

Optionally, in a scenario of the baseband cloud, the first determining unit 701 is specifically configured to determine multiple base stations that are interconnected by using a universal switching unit, and acquire, as the multiple target cells, cells that are currently to be activated in the multiple base stations.

Optionally, in the scenario of the baseband cloud, the cell activation apparatus further includes an acquiring unit configured to acquire priorities of the base stations to which the multiple target cells belong.

Correspondingly, the second determining unit is specifically configured to sort the multiple target cells according to the priorities, acquired by the acquiring unit, of the base stations to which the multiple target cells belong.

Optionally, in one aspect, in a process in which the multiple target cells are sorted according to the priorities of the base stations to which the multiple target cells belong, the second determining unit is specifically configured to, when a first target cell and a second target cell in the multiple target cells are located in a same base station or are located in base stations with a same priority, rank the first target cell above the second target cell, or rank the second target cell above the first target cell.

Optionally, in another aspect, in a process in which the multiple target cells are sorted according to the priorities of the base stations to which the multiple target cells belong, the second determining unit is specifically configured to: when a first target cell and a second target cell in the multiple target cells are located in a same base station or are located in base stations with a same priority, sort the first target cell and the second target cell according to initial priorities of the first target cell and the second target cell in the base stations to which the first target cell and the second target cell belong.

In any one of foregoing embodiments of the cell activation apparatus, before determining the multiple target cells that are currently to be activated, the first determining unit is further configured to determine an active cell that is currently in an active state and the apparatus further includes: a detection unit configured to detect whether an abnormal target cell that is not activated exists in the multiple target cells; and a deactivation unit configured to, when the detection unit finds through detection the abnormal target cell, and that a priority of the abnormal target cell is higher than a priority of the active cell, deactivate the active cell.

Correspondingly, the activation unit is further configured to activate the abnormal target cell.

Figure 8:
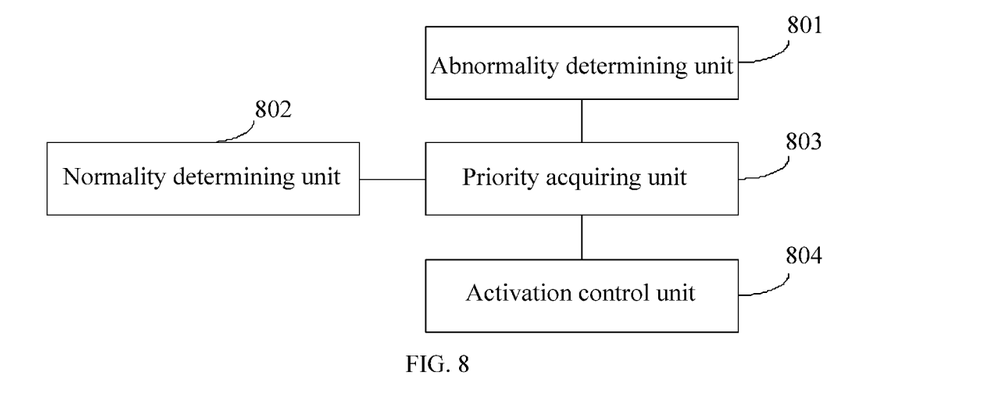
FIG. 8 is a schematic structural diagram of another embodiment of another cell activation apparatus according to this application.

Corresponding to another cell activation method of this application, this application further provides a cell activation apparatus. Refer to FIG. 8, which is a schematic structural diagram of an embodiment of another cell activation apparatus according to this application. The apparatus of this embodiment may include an abnormality determining unit 801 configured to determine an abnormal cell whose service is abnormal because of a base station resource failure, where after the base station activates the cell, if the base station resource occupied by the cell fails, and the cell cannot normally provide a service, the cell is determined as an abnormal cell; a normality determining unit 802 configured to determine a normal cell that is in an active state and in which no abnormality of the service occurs; a priority acquiring unit 803 configured to acquire a cell priority of the abnormal cell that is determined by the abnormality determining unit and a cell priority of the normal cell that is determined by the normality determining unit; and an activation control unit 804 configured to, after the priority acquiring unit acquires the priorities of the normal cell and the abnormal cell, if the cell priority of the abnormal cell is higher than the cell priority of the normal cell, deactivate the normal cell and activate the abnormal cell.

In this embodiment, after an abnormal cell whose service is abnormal because of a base station resource failure is determined, if a cell priority of the abnormal cell is higher than a cell priority of a normal cell, the normal cell is deactivated, and the abnormal cell is activated, so that the abnormal cell with a higher priority is preferentially in an active state and provides a service to the outside, so as to reduce cases that an important cell with a higher priority cannot provide the service to the outside because of the insufficient base station resources, and further to improve stability of a wireless communications system.

When the cell activation apparatus is applied to a scenario in which a single base station activates a cell in the base station, the abnormality determining unit may determine a cell whose service is abnormal because of the base station resource failure in the base station. Correspondingly, the normality determining unit determines a cell that is in an active state in the base station and in which no abnormality of the service occurs.

When the cell activation apparatus is applied to the baseband cloud scenario, optionally, the abnormality determining unit may include a target base station determining unit configured to determine multiple base stations that are interconnected by using a universal switching unit, and an abnormality determining subunit configured to determine an abnormal cell whose service is abnormal because of a base station resource failure in the multiple base stations.

The normality determining unit includes: a normality determining subunit configured to determine a normal cell that is in an active state and in which no abnormality of the service occurs in the multiple base stations.

Optionally, in a case in which the abnormality determining unit includes the abnormality determining subunit and the normality determining unit includes the normality determining subunit, the priority acquiring unit may include a priority acquiring subunit configured to acquire a base station priority of the base station, an initial priority of the abnormal cell in a base station to which the abnormal cell belongs, and an initial priority of the normal cell in a base station to which the normal cell belongs; and a priority determining unit configured to determine the cell priority of the abnormal cell and the cell priority of the normal cell according to the base station priority, the initial priority of the abnormal cell, and the initial priority of the normal cell, where for either of the abnormal cell and the normal cell, a higher cell priority of the cell indicates a higher base station priority of the base station to which the cell belongs, and indicates a higher initial priority of the cell in the base station to which the cell belongs.

Optionally, in any one of the foregoing embodiments, the activation control unit may include an activation control subunit configured to, after the priority acquiring unit acquires the priorities of the normal cell and the abnormal cell, if the cell priority of the abnormal cell is higher than the cell priority of the normal cell, and when service traffic of the normal cell is less than a preset threshold, deactivate the normal cell and activate the abnormal cell.

Optionally, another cell activation apparatus of this application may further include a reactivation unit configured to reactivate the normal cell when it is detected that the abnormal cell cannot be activated.

Optionally, in any one of the foregoing embodiments, when multiple abnormal cells exist, the activation control unit may specifically determine the abnormal cells as abnormal target cells sequentially in descending order of cell priorities of the abnormal cells, if the cell priority of the abnormal target cell that is currently determined is higher than the cell priority of the normal cell, deactivate the normal cell, and activate the abnormal target cell, until all abnormal cells are used as abnormal target cells.

Figure 9:
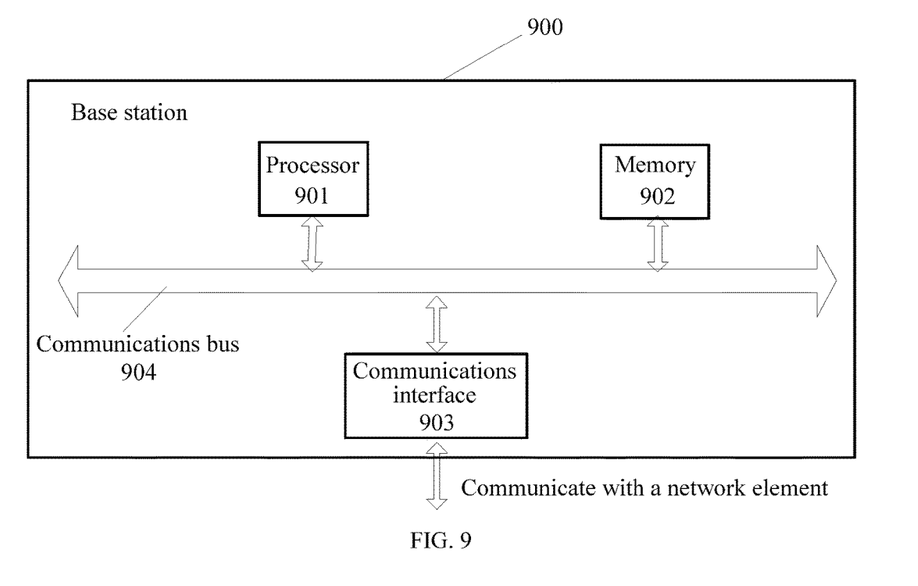
FIG. 9 is a schematic structural diagram of an embodiment of a base station according to this application.

In another aspect, this application further provides a base station. Refer to FIG. 9, which is a schematic structural diagram of an embodiment of the base station according to this application. The base station 900 includes at least a processor 901, a memory 902, a communications interface 903, and a communications bus 904.

The processor 901, the memory 902, and the communications interface 903 complete communications with each other by using the communications bus 904.

The communications interface 903 is configured to perform communication with another network element or an external device, such as another node and a network terminal in a wireless communications system.

The processor 901 is configured to determine multiple target cells that are currently to be activated, determine a priority sequence of the multiple target cells, and activate the multiple target cells in sequence according to the determined priority sequence.

Information about a program executed by the processor exists in the memory 902. The memory may include a high-speed random-access memory (RAM), or may further include a nonvolatile memory.

Figure 10:
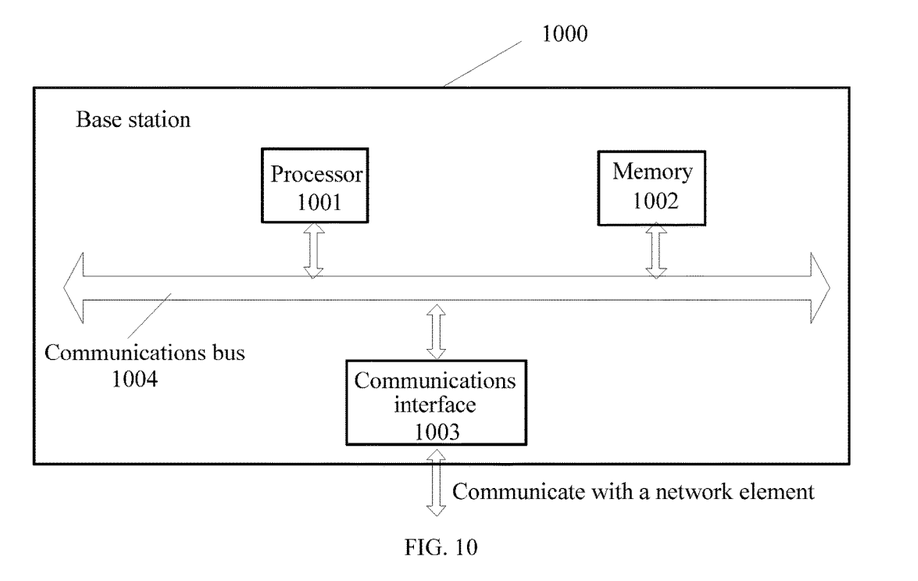
FIG. 10 is a schematic structural diagram of an embodiment of another base station according to this application.

In another aspect, this application further provides another base station. Refer to FIG. 10, which is a schematic structural diagram of an embodiment of another base station according to this application. The base station 1000 of this embodiment includes at least a processor 1001, a memory 1002, a communications interface 1003, and a communications bus 1004.

The processor 1001, the memory 1002, and the communications interface 1003 complete communication with each other by using the communications bus 1004.

The communications interface 1003 is configured to perform communication with another network element or an external device, such as another node and a network terminal in a wireless communications system.

The processor 1001 is configured to determine an abnormal cell whose service is abnormal because of a base station resource failure, determine a normal cell that is in an active state and in which no abnormality of the service occurs, acquire cell priorities of the abnormal cell and the normal cell, and if the cell priority of the abnormal cell is higher than the cell priority of the normal cell, deactivate the normal cell and activate the abnormal cell.

Information about a program executed by the processor exists in the memory 1002. The memory may include a high-speed RAM, or may further include a nonvolatile memory.

It should be noted that the embodiments in this specification are all described in a progressive manner, each embodiment focuses on a difference from other embodiments, and for same or similar parts in the embodiments, refer to these embodiments. An apparatus embodiment is basically similar to a method embodiment, and therefore is described briefly; for related parts, refer to partial descriptions in the method embodiment.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

For ease of description, the foregoing apparatus is described by dividing functions into various units. Certainly, during implementation of the present disclosure, the functions of each unit may be implemented in a same piece of or a plurality of pieces of software and/or hardware.

Based on the foregoing descriptions of the implementation manners, a person skilled in the art may clearly understand that the present application may be implemented by software in addition to a necessary general hardware platform. Based on such an understanding, the technical solutions of the present application essentially or the part contributing to some approaches may be implemented in a form of a software product. The computer software product may be stored in a storage medium, such as a read-only memory (ROM) or a RAM, a magnetic disk, or an optical disc, and includes several instructions for instructing a computer device (which may be a personal computer, a server, or a network device) to perform the methods described in the embodiments or some parts of the embodiments of the present application.

The foregoing in detail describes a cell activation method and apparatus provided by this application. In this specification, specific examples are used to describe the principle and implementation manners of the present application, and the description of the embodiments is only intended to help understand the method and core idea of the present application. In addition, a person of ordinary skill in the art may, based on the idea of the present application, make modifications with respect to the specific implementation manners and the application scope. Therefore, the content of this specification shall not be construed as a limitation to the present application.

What is claimed is:

1. A cell activation method, applied to a system in which base stations are interconnected using a universal switching unit, wherein a base station that controls resource management in the base stations and that controls activation of cells is a target base station, the method comprising:
   obtaining, by the target base station, cells that are to be activated in the base stations according to configuration information of the cells;
   determining, by the target base station, that the cells are target cells;
   determining, by the target base station, a priority sequence of the target cells;
   activating, by the target base station, the target cells in the priority sequence; and
   activating, by the target base station, an abnormal cell in the base stations,
   wherein the abnormal cell comprises a cell in which a base station resource failure has occurred,
   wherein the abnormal cell activation comprises deactivating one of the target cells and allocating a resource from the one of the deactivated target cells to the abnormal cell, and
   wherein the one of the target cells that is deactivated is selected based on the one of the target cells having a lower priority than the abnormal cell.

2. The method according to claim 1, wherein determining the priority sequence comprises:
   acquiring priorities of the base stations; and
   sorting the target cells according to the priorities of the base stations.

3. The method according to claim 2, wherein sorting the target cells comprises ranking a first target cell above a second target cell when the first target cell and the second target cell are located in a same base station or in base stations with a same priority.

4. The method according to claim 2, wherein sorting the target cells comprises ranking a second target cell above a first target cell when the first target cell and the second target cell are located in a same base station or in base stations with a same priority.

5. The method according to claim 2, wherein sorting the target cells comprises sorting a first target cell and a second target cell according to initial priorities of the first target cell and the second target cell in the base stations to which the first target cell and the second target cell belong when the first target cell and the second target cell are located in a same base station or in base stations with a same priority.

6. The method according to claim 1, wherein each of the base stations comprises an evolved node B (eNodeB) in a Long-Tem Evolution (LTE) network.

7. A target base station in a plurality of base stations such that the target base station comprises:
   a memory; and
   a processor coupled to the memory and configured to:
      control resource management in base stations interconnected using a universal switching unit;
      obtain cells that are to be activated in the base stations according to configuration information of the cells;
      determine that the cells are target cells;
      determine a priority sequence of the target cells; and
      activate the target cells according to the priority sequence; and
      activate an abnormal cell in the base stations,
   wherein the abnormal cell comprises a cell in which a base station resource failure has occurred,
   wherein the abnormal cell activation comprises deactivating one of the target cells and allocating a resource from the one of the deactivated target cells to the abnormal cell, and
   wherein the one of the target cells that is deactivated is selected based on the one of the target cells having a lower priority than the abnormal cell.

8. The target base station according to claim 7, wherein the processor is further configured to:
   acquire priorities of the base stations; and
   sort the target cells according to the priorities of the base stations.

9. The target base station according to claim 8, wherein the processor is further configured to sort the target cells by ranking a first target cell above a second target cell when the first target cell and the second target cell are located in a same base station or in base stations with a same priority.

10. The target base station according to claim 8, wherein the processor is further configured to sort the target cells by sorting a first target cell and a second target cell according to initial priorities of the first target cell and the second target cell in the base stations to which the first target cell and the second target cell belong when the first target cell and the second target cell are located in a same base station or in base stations with a same priority.

11. The target base station according to claim 7, wherein each of the base stations comprises an evolved node B (eNodeB) in a Long-Tem Evolution (LTE) network.

* * * * *